United States Patent [19]
Wakabayashi et al.

[11] Patent Number: 6,101,211
[45] Date of Patent: *Aug. 8, 2000

[54] NARROW-BAND LASER APPARATUS

[75] Inventors: Osamu Wakabayashi, Oyama; Hiroshi Komori; Hakaru Mizoguchi, both of Hiratsuka, all of Japan

[73] Assignee: Komatsu, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,219

[22] PCT Filed: Apr. 3, 1996

[86] PCT No.: PCT/JP96/00921

§ 371 Date: Oct. 1, 1997

§ 102(e) Date: Oct. 1, 1997

[87] PCT Pub. No.: WO96/31929

PCT Pub. Date: Oct. 10, 1996

[30] Foreign Application Priority Data

Apr. 3, 1995 [JP] Japan ................................. 7-078015

[51] Int. Cl.[7] .................................................. H01S 3/08
[52] U.S. Cl. ............................................. 372/102; 372/108
[58] Field of Search ...................................... 372/102, 108

[56] References Cited

U.S. PATENT DOCUMENTS

| | | | |
|---|---|---|---|
| 4,127,828 | 11/1978 | Klauminzer | 372/102 |
| 4,873,692 | 10/1989 | Johnson et al. | 372/102 |
| 4,985,898 | 1/1991 | Furuya et al. | 372/102 |
| 5,166,941 | 11/1992 | Hackel | 372/102 |
| 5,177,750 | 1/1993 | Zorabedian | 372/102 |
| 5,181,222 | 1/1993 | Duarte | 372/102 |
| 5,230,005 | 7/1993 | Rubino et al. | 372/102 |
| 5,325,378 | 6/1994 | Zorabedian | 372/102 |
| 5,491,714 | 2/1996 | Kitamura | 372/102 |
| 5,524,018 | 6/1996 | Adachi | 372/102 |
| 5,548,609 | 8/1996 | Kitamura | 372/102 |
| 5,559,816 | 9/1996 | Basting et al. | 372/102 |
| 5,617,435 | 4/1997 | Nagai et al. | 372/102 |

FOREIGN PATENT DOCUMENTS

| | | |
|---|---|---|
| 62-123788 | 6/1987 | Japan . |
| 2-2188 | 1/1990 | Japan . |
| 3-214680 | 9/1991 | Japan . |
| 3-259583 | 11/1991 | Japan . |
| 4-18783 | 1/1992 | Japan . |
| 5-41164 | 1/1992 | Japan . |
| 4-262588 | 9/1992 | Japan . |
| 5-102584 | 4/1993 | Japan . |

OTHER PUBLICATIONS

IEE Journal of Quantum Electronics, Direct Bandwidth and Polarization Control of an XEF Unstable Resonator Laser, Nov., 1988, vol. 24, No. 11, pp. 2270–2283.

*Primary Examiner*—Peresa M. Arroyo
*Assistant Examiner*—Robert E. Wise
*Attorney, Agent, or Firm*—Welsh & Katz, Ltd.

[57] ABSTRACT

A narrow-band laser apparatus comprising a laser generating section having laser activity and capable of generating laser beam; bandwidth narrowing section which is provided on one end side of the laser generating section on the optical axis of the laser beam generated in the laser generating section to narrow the bandwidth of the laser beam by means of at least one angel-dispersion wavelength selection element, fold back the laser beam in the narrowed band and output the folded laser beam toward the laser generating section; beam folding section which is provided on the other end of the laser generating section on the optical axis of the laser beam generated in the laser generating section to fold back the input laser beam and reflect the folded laser beam into the laser generating section; and a laser beam branching unit which is provided between the laser generating section and the bandwidth narrowing section to permit part of the laser beam input from the laser generating section to pass therethrough into the bandwidth narrowing section while deflecting the remaining part of the laser beam and drawing out the same as an output beam. The laser apparatus is constructed so that the light which has passed straight through the laser beam branching unit is input into the bandwidth narrowing section, thereby stabilizing a resonance system to eliminate multiwavelength oscillation accompanying the vibration.

16 Claims, 16 Drawing Sheets

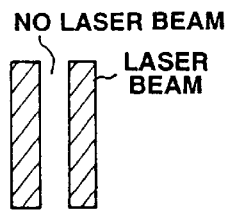
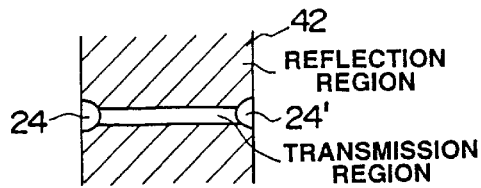
FIG.6(a)  FIG.6(b)
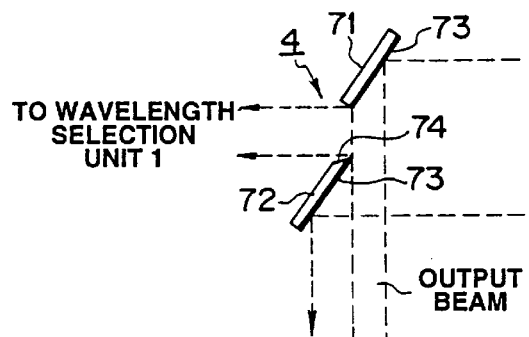
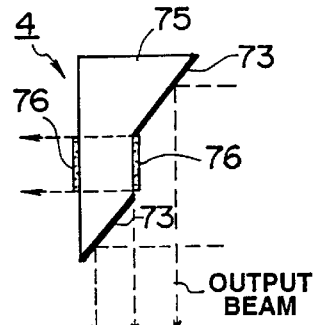
FIG.7(a)  FIG.7(b)
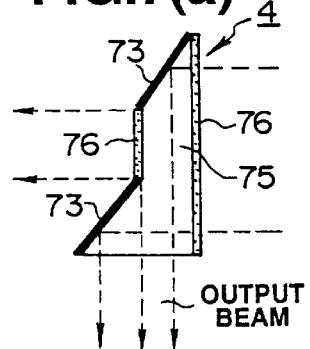
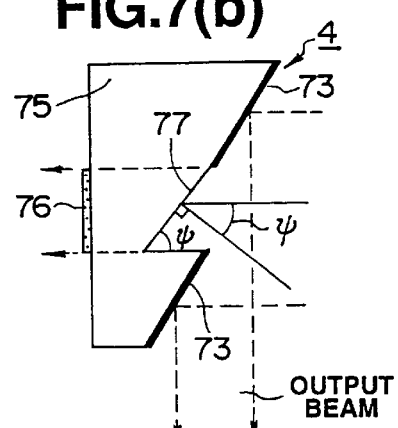
FIG.7(c)  FIG.7(d)
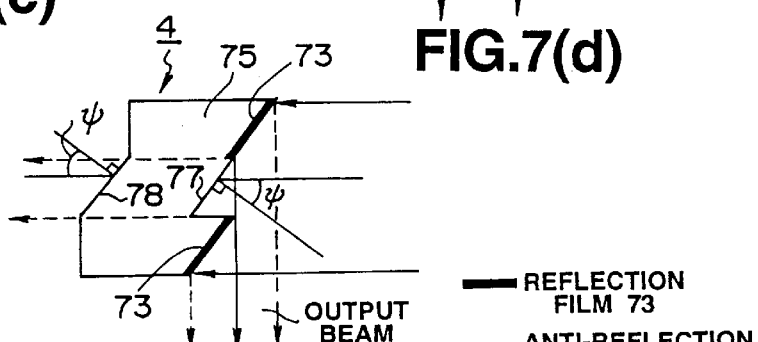
FIG.7(e)

NARROW-BAND LASER APPARATUS

TECHNICAL FIELD

The present invention relates to a narrow-band laser apparatus employed as a light source for a semiconductor exposure tool for optical microlithography process.

BACKGROUND ART

Owing to the increasingly higher densities of integration in the arrangement of semiconductor elements, semiconductor exposure tools are being required to have higher resolution and deeper depth of focus. To achieve this, there is a trend towards use of shorter wavelengths, specifically, there has been a progressive shift towards shorter wavelengths for the light sources of semiconductor exposure tools, from the g line of high-pressure mercury lamps to the i line, and further, to KrF excimer lasers.

However, when the deep ultraviolet region, such as a KrF excimer laser (248 nm) or ArF excimer laser (193 nm) is employed as the generated laser beam, only a few types of optical material are suitable for use in the projection lens so that it is difficult to correct chromatic aberration. Consequently, in such excimer lasers, a monochromatic lens in which correction for chromatic aberration is not performed is employed as projection lens, and exposure tool light sources are employed in which monochromaticity is raised by narrowing the bandwidth of the excimer laser itself.

However, a narrow band laser apparatus in which all of the output light from the laser generating section 160 is input to a band-narrowing element as shown for example in FIG. 19 suffers from drawbacks such as that the laser beam output becomes small because of large losses in the band-narrowing element and that there are problems of durability due to the large load on the band-narrowing element. This trend is particularly marked in the case of a short-wavelength ArF narrow-band excimer laser. In FIG. 19, reference numeral 160 is the laser generating section, 161 is the band-narrowing element, 162 is a total reflection mirror, and 163 is a half mirror.

Accordingly, in the excimer laser technique illustrated in Japanese patent publication (kokai) No. 3-259583, an attempt to solve these problems is made by dividing the laser beam by a dividing mirror, inputting part of the divided laser beam to a band-narrowing element, and outputting remaining part as laser output: the construction is shown in FIG. 20–FIG. 21.

In FIG. 20, at one end of a laser tube 131 containing laser medium, there are provided a control plate 136 having a window 134 and slit 136a and a high-reflectivity mirror 135, while, at the other end of laser tube 131, there are provided a window 134, dividing mirror 137, first etalon 138, second etalon 139, high reflectivity fold-back mirror 141, beam splitter 142, dispersion plate 143, monitor etalon 144, condensing lens 145, linear line sensor 146, and oscilloscope 147.

In such a construction, some of the laser beam that is output from the left-hand window 134 is divided and reflected by dividing mirror 137 and is subjected to band-narrowing by passing through first etalon 138 and second etalon 139. The laser beam that has been subjected to band narrowing is reflected by high-reflectivity folding-back mirror 141 and dividing mirror 137 so that it is folded back to the laser excitation zone 132 in laser tube 131. After being amplified in laser excitation zone 132, the laser beam again passes through the same optical path as described above, but diverging with an angle θ, before being emitted through left-hand window 134. Also, part of the laser beam that is emitted is reflected by dividing mirror 137 to be input once more to first etalon 138 and second etalon 139, the remaining part being output as output laser beam L. Part (about 1%) of output laser beam L is reflected at beam splitter 142 and input to linear line sensor 146, so that the intensity distribution of the laser beam can be monitored using the output of the sensor.

With this conventional laser apparatus, an output of high spectral purity containing few ASE (amplified spontaneous emission) components is sought to be obtained by avoiding the use of optical components such as beam expanders that cause generation of dispersed light, and the load on the band-narrowing element is sought to be reduced by arranging for the laser beam to be divided by a dividing mirror 137 and for the divided portion of the laser beam to be input to the band-narrowing element.

If an etalon is employed as band narrowing element and wavelength selection element, since the etalon itself is an element that selects the angle of incidence, an output beam of high spectral purity with little ASE component can be obtained without deterioration of the shape of the spectral distribution. However, if an etalon is used, the following problems arise in the case of a wavelength as short as that of an ArF laser (193 nm).

a. Although the load on the etalon can be reduced to some extent by a resonator as shown in FIG. 20, there are problems regarding durability.

b. In order to make the spectral width less than 1 pm, it is necessary to provide a plurality of etalons, which raises the cost.

c. Since the selected wavelength of an etalon fluctuates considerably due to heat, there are considerable difficulties in controlling a plurality of etalons such that they do not show thermal fluctuation.

Thus, for the band narrowing element and wavelength selection element, rather than elements such as etalons, which are not of angle-dispersion type, it is more advantageous in regard to solving the above problems to employ angle-dispersion type band-narrowing and wavelength selection elements.

FIG. 21 shows another embodiment illustrated in Japanese patent publication (kokai) No. 3-259583 referred to above. In this conventional laser apparatus, instead of the first etalon 138, second etalon 139 and high reflectivity fold-back mirror 141 used to constitute the band narrowing element in FIG. 20, an angle-dispersion type band narrowing element constituted by prism beam expander 156 and diffraction grating 157 is used.

However, if an angle-dispersion type band narrowing element is employed, since an angle-dispersion type band narrowing element diffracts the light in all directions in the plane of the dispersion direction, a large number of parasitic oscillations are produced as shown by the dotted line in FIG. 2. This had a severely adverse effect on the shape of the spectral distribution of the beam.

Also, there are the following problems common to the techniques shown in FIG. 20 and FIG. 21, which are disclosed in Japanese patent publication (kokai) No. 3-259583.

Since the optical path of the resonator is bent by dividing mirror 137, the resonator is unstable and resonates at a large number of wavelengths depending on vibration and thermal distortion. Angle-dispersion type elements are particularly subject to vibration.

Since beam division is effected by utilizing the edge portion of dividing mirror 137, if the planar accuracy of the edge portion is poor, the wave surface of the beam enters the band-narrowing element in a distorted condition, adversely affecting the shape of the spectral distribution.

FIG. 22 shows another conventional technique wherein a resonator construction is adopted such as to reduce the load on the band-narrowing element (Japanese patent publication (kokai) No. 2-213178).

In this conventional technique shown in FIG. 22, a totally reflecting mirror 152 is provided on one side of laser discharge tube 151 and a totally reflecting mirror 153 is provided on the other side, a semi-transparent mirror 154 being arranged between laser discharge tube 151 and totally reflecting mirror 152. Thus, in using the light reflected by semi-transparent mirror 154 as output beam 156 for semiconductor exposure etc., band narrowing of the laser beam can be achieved by using grating 155 to narrow the band of the light passing through semi-transparent mirror 154, then returning the beam to within laser discharge tube 151.

However, with this conventional technique, since only part of the light reflected by totally reflecting mirror 152 after band narrowing by grating 155 passes through semi-transparent mirror 154 and is thereby folded back to laser discharge tube 151 and amplified, the rest of the light being reflected in the opposite direction to laser output beam 156 and discarded, there is a waste of light energy.

If an excimer laser is employed as light source of a semiconductor exposure tool, as well as narrowing the laser bandwidth, it is necessary to obtain large output by effectively utilizing the optical energy generated in the interior of the discharge tube, so such waste of part of the beam has to be avoided. Thus, with the conventional narrow-band laser device, there were problems concerning the durability of the band narrowing element that generation of a lot of parasitic oscillations produced distortion of the shape of the spectral distribution, the resonator was unstable, and also drawbacks such as high cost, liability to be effected by thermal fluctuation and waste of optical energy.

It is an object of the present invention to provide a narrow band laser apparatus wherein the above-mentioned drawbacks are improved, the spectral distribution of the laser beam is well-formed, which is stable and has excellent durability and wherein energy is not wasted.

DISCLOSURE OF THE INVENTION

Accordingly, in the present invention there is provided a laser generating section having laser activity, for generating a laser beam; bandwidth narrowing means arranged at one end of the laser generating section on an optical axis of the laser beam generated by the laser generating section, for narrowing bandwidth of the laser beam by means of at least one angle-dispersion wavelength selection element, and folding beck the laser beam that has been narrowed in bandwidth to emit the laser beam to the laser generating section; beam folding-back means arranged at another end of the laser generating section on the optical axis of the laser beam generated by the laser generating section, for folding-back the laser beam that is input, and reflecting it to the laser generating section; and a laser beam branching unit arranged between the laser generating section and the bandwidth narrowing means, for transmitting part of the laser beam that is input from the laser generating section to input it to the bandwidth narrowing means and deflecting remaining part of the laser beam to output it as an output beam.

With this construction of the invention, the light is input to the bandwidth narrowing means after having passed straight through the laser beam branching unit, there is no bending of the optical path of the resonator, which makes the resonance system stable, and eliminates multi-wavelength oscillations caused by vibration. As a result, laser output can be obtained with improved efficiency of bandwidth narrowing and having a well-formed spectral distribution.

Further, according to the invention there are provided a laser generating section having laser activity, for generating a laser beam; bandwidth narrowing means arranged at one end of the laser generating section on an optical axis of the laser beam generated by the laser generating section, for narrowing bandwidth of the laser beam by means of at least one angle-dispersion wavelength selection element, and folding beck the laser beam that has been narrowed in bandwidth to emit the laser beam to the laser generating section; beam folding-back means arranged at another end of the laser generating section on the optical axis of the laser beam generated by the laser generating section, for folding-back the laser beam that is input, and reflecting it to the laser generating section; a laser beam branching unit arranged between the laser generating section and the bandwidth narrowing means, for inputting part of the laser beam that is input from the laser generating section to the bandwidth narrowing means and outputting remaining part of the laser beam as an output beam; and beam width restricting means width for restricting the width of the laser beam that is input to the bandwidth narrowing means in the direction of angle-dispersion of the angle-dispersion wavelength selection element.

With this construction of the invention, the beam is restricted in the direction of angle-dispersion of the means for narrowing bandwidth by the means for restricting beam width, laser output can be obtained having a well-formed spectral distribution without parasitic oscillations.

BRIEF DESCRIPTION OF THE DRAWINGS

FIGS. 6(*a*) and 6(*b*) are views showing a hollow-profile laser beam that is output from the laser apparatus of the embodiment of FIG. 5;

FIGS. 7(*a*) through 7(*e*) are views showing various types of beam output mirror employed instead of the apertured mirror of the embodiment of FIG. 5;

BEST MODE FOR CARRYING OUT THE INVENTION

Figure 1:
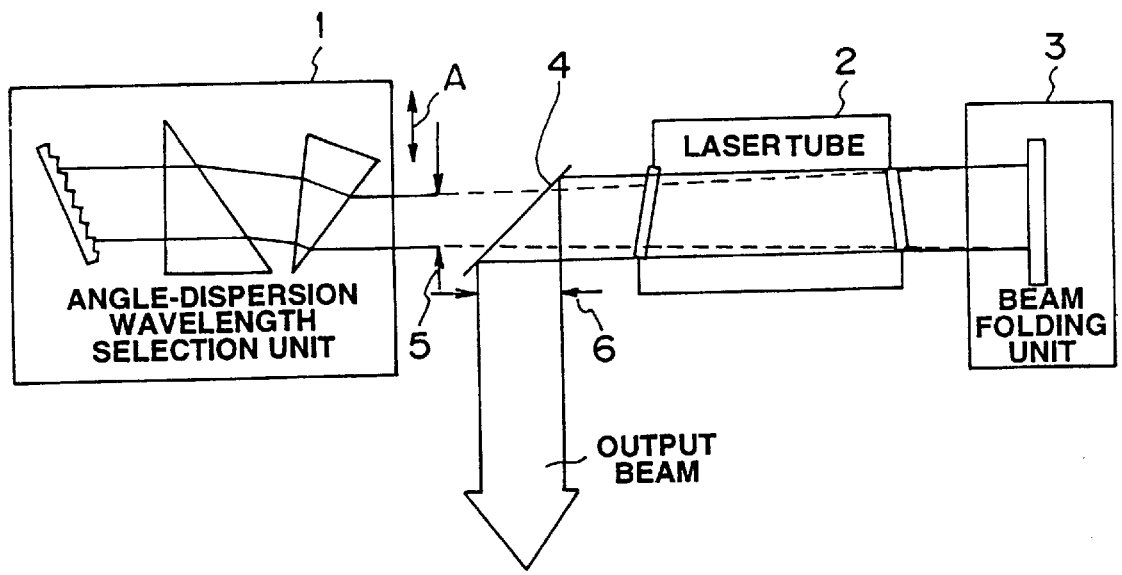
FIG. 1 is a plan view of a narrow band laser apparatus according to an embodiment of the present invention.

Embodiments of the present invention are described below in detail with reference to the appended drawings. FIG. 1 shows an embodiment of a narrow band laser apparatus according to the present invention, showing the most basic construction of the constructions of the various embodiments to be described below.

In FIG. 1, reference numeral 1 is an angle-dispersion wavelength selection element unit, 2 is a laser tube containing laser medium, 3 is a beam folding unit that folds back a laser beam in the direction in which it was input, 4 is a beam branching unit that transmits part of the laser beam and inputs it to angle-dispersion wavelength selection element unit 1, and which operates to reflect the remaining part such that it is output as an output beam, 5 is a beam restricting unit that restricts the beam in the direction of angle-dispersion (direction A in the drawings) of angle-dispersion wavelength selection element unit 1, and 6 is a beam restriction unit that restricts the beam of the output light.

In the construction of FIG. 1, a laser beam generated in laser tube 2 passes through a beam branching unit 4 and then, passing through beam restricting unit 5 that is provided with a slit or a window-shaped aperture having an optical screening portion at its periphery, is input to an angle-dispersion wavelength selection element unit 1 in which is arranged a wavelength dispersion element of the angle-dispersion type. The laser beam is narrowed in bandwidth by being folded back by angle-dispersion wavelength selection element unit 1 and is then once more passed through beam restricting unit 5 and beam branching unit 4 and, with a prescribed angle of divergence, is amplified by passing through laser tube 2. After the beam has passed through laser tube 2, it is folded back by beam folding unit 3 and again amplified by laser tube 2. Part of the output beam from laser tube 2 passes through beam branching unit 4 and beam restricting unit 5 and is input once more to angle-dispersion wavelength selection element unit 1. The remaining part of the beam is bent by reflection at beam branching unit 4 and is output as an output beam.

Figure 2:
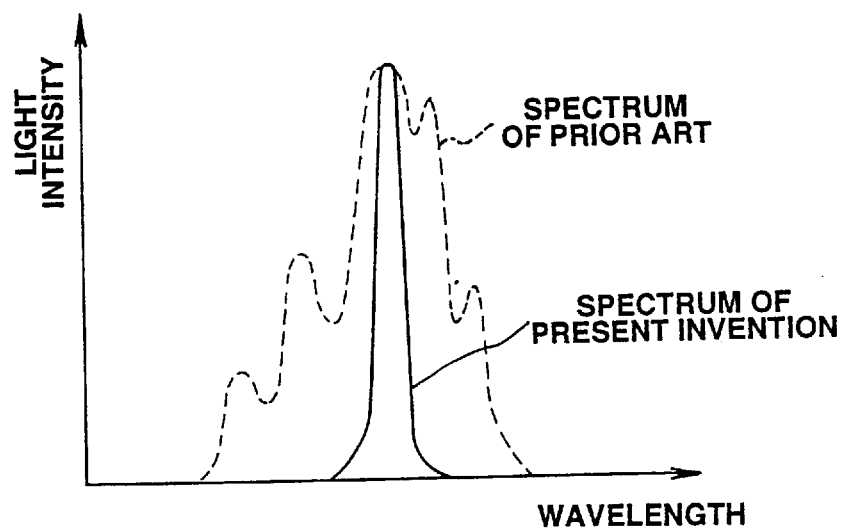
FIG. 2 is a view showing the output spectrum of laser light that is output from a narrow band laser apparatus according to the embodiment shown in FIG. 1 and a view showing the output spectrum of laser light that is output from a conventional device.
Figure 3A:
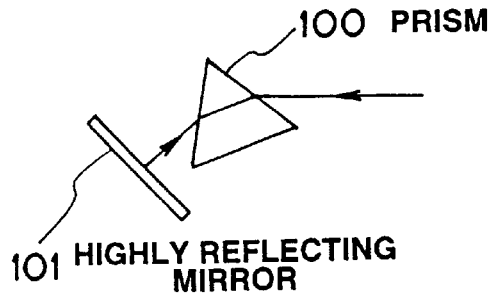
FIGS. 3(*a*) through 3(*d*) are views showing specific constructional examples of an angle-dispersion wavelength selection element employed in the embodiment.
Figure 3B:
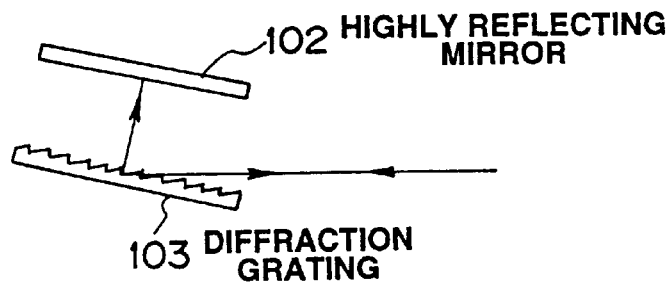
Figure 3C:
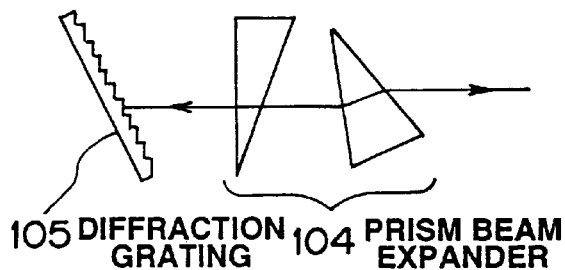
Figure 3D:
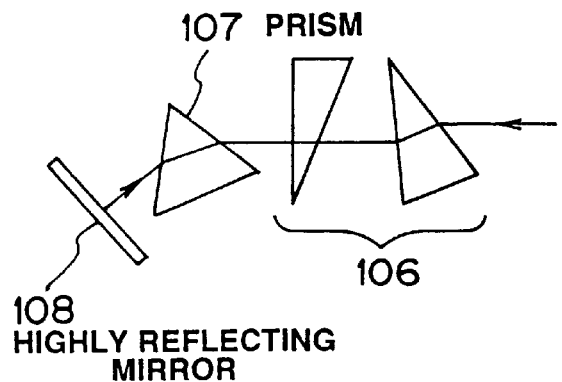
Figure 4A:
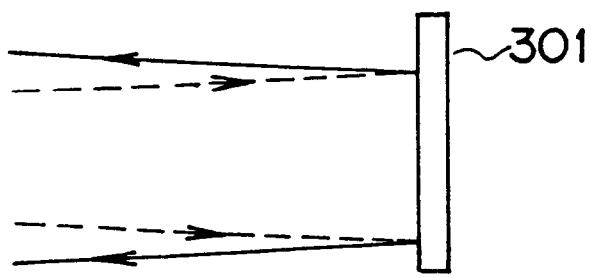
FIGS. 4(*a*) through 4(*d*) are views showing specific constructional examples of a beam folding unit used in the embodiment.
Figure 4B:
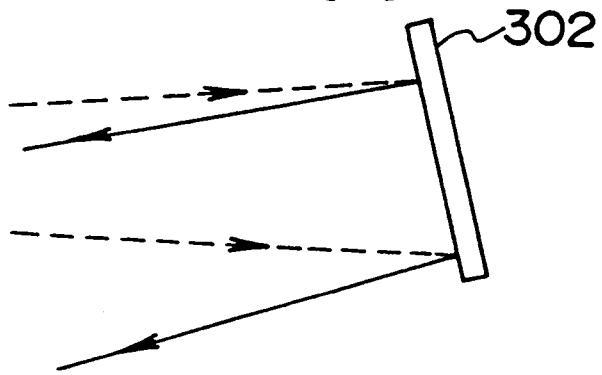
Figure 4C:
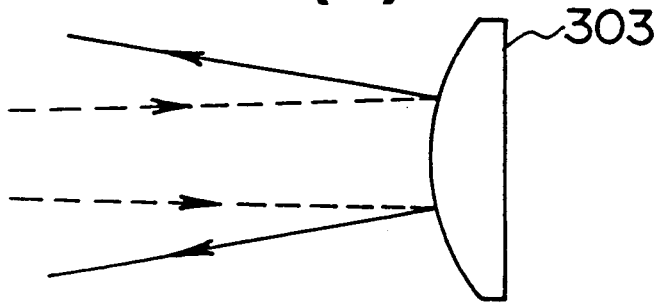
Figure 4D:
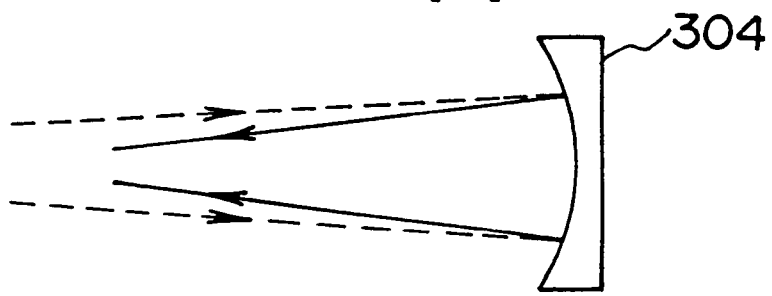
Figure 20:
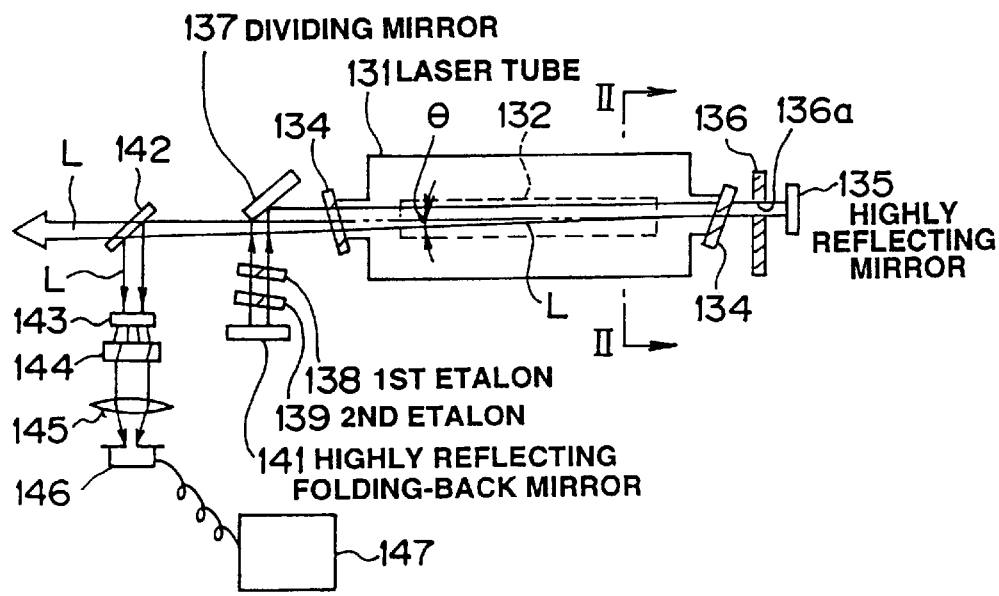
FIG. 20 is a view showing another conventional laser apparatus.
Figure 21:
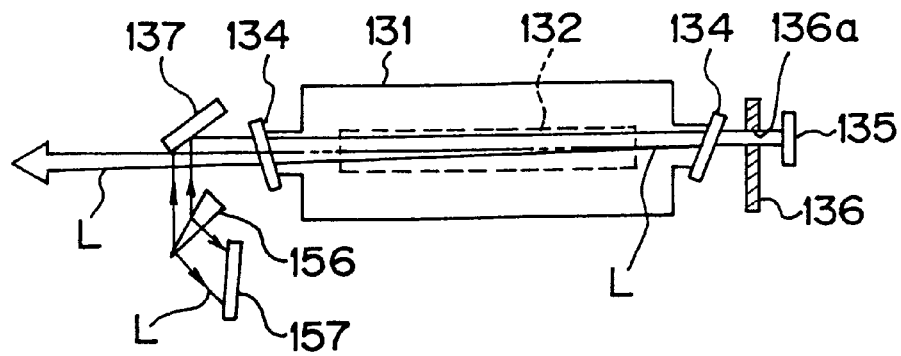
FIG. 21 is a view showing still another conventional laser apparatus.
Figure 22:
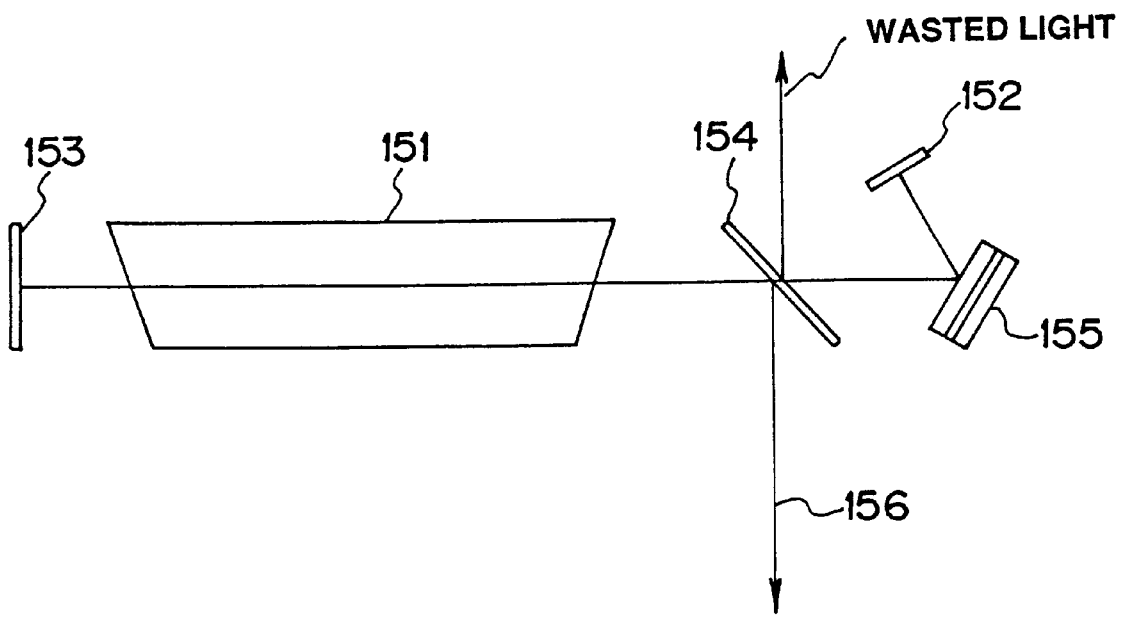
FIG. 22 is a view showing yet another conventional laser apparatus.

FIG. 2 shows a comparison of the spectral distribution of a narrow band laser apparatus according to the present invention shown in FIG. 1 with the spectral distribution of a narrow band laser apparatus constituting a conventional example shown in FIG. 20. As can be seen from FIG. 2, the spectral distribution of the output beam of the narrow band laser apparatus of the present invention is an extremely well formed distribution without parasitic oscillation.

The reasons for the absence of parasitic oscillations in the spectral distribution of the output beam obtained in this way include:

a. Parasitic oscillation is eliminated since the beam is restricted by beam restricting unit 5 in the direction of angle-dispersion of bandwidth narrowing means 1.

b. Since the beam is input to bandwidth narrowing means 1 after passing straight through beam branching unit 4, bending of the optical path of the resonator is eliminated: this stabilizes the resonance system and eliminates the multiple-wavelength oscillations produced by vibration.

c. The angle-dispersion wavelength selection element 1 is more stable in regard to heat than an etalon, so wavelength drift is eliminated.

FIGS. 3(*a*) through 3(*c*) show specific constructional examples of angle-dispersion wavelength selection element unit 1 shown in FIG. 1.

In FIG. 3(*a*), angle-dispersion wavelength selection element unit 1 is implemented by a dispersion prism 10 and high-reflectivity mirror 101. It should be noted that an angle-dispersion wavelength selection element unit 1 could be constituted by a combination of a plurality of prisms and beam expanders.

In FIG. 3(*b*), a high-reflectivity mirror 102 and diffraction grating 103 are combined, these being arranged for grazing incidence. It should be noted that, in addition, a beam expander could be combined with this assembly.

In FIG. 3(*c*), a prism beam expander 104 and diffraction grating 105 are combined, diffraction grating 105 being a Littrow arrangement. It should be noted that the bandwidth narrowing effect can be increased by employing an echelle grating of large blaze angle for diffraction grating 105.

In FIG. 3(*d*), an angle-dispersion wavelength selection element unit 1 is constituted by a prism beam expander 106, dispersion prism 107 and high-reflectivity mirror 108.

FIGS. 4(*a*) through 4(*d*) show specific constructional examples of the beam folding unit 3 of FIG. 1.

In FIG. 4(*a*), a plane mirror 301 is employed as beam folding unit 3 and the optical axis of the plane mirror 301 is made to practically coincide with the optical axis of angle-dispersion wavelength selection element unit 1.

In FIG. 4(*b*), the plane mirror 302 is employed as beam folding unit 3, its optical axis being arranged with an angle with respect to the optical axis of angle-dispersion wavelength selection element unit 1.

FIG. 4(*c*) is an example in which a convex-surface mirror 303 is employed; FIG. 4(*d*) is an example in which a concave-surface mirror 304 is employed. By use of a convex-surface or concave-surface mirror, the angle of divergence of the beam can be adjusted and the ratio of the beam that is input to angle-dispersion wavelength selection element unit 1 and the beam that is output as output beam can be optimized. As a result, a laser beam with a well-formed spectral distribution can be output with high efficiency.

Furthermore, by arranging a convex or concave-surfaced cylindrical mirror instead of the above convex-surface mirror 303 or concave-surface mirror 304, and arranging the mechanical axis of the mirror in a direction practically perpendicular to the plane of dispersion of the angle-dispersion wavelength selection element, an output beam of good spectral distribution shape can be obtained more efficiently.

Figure 5:
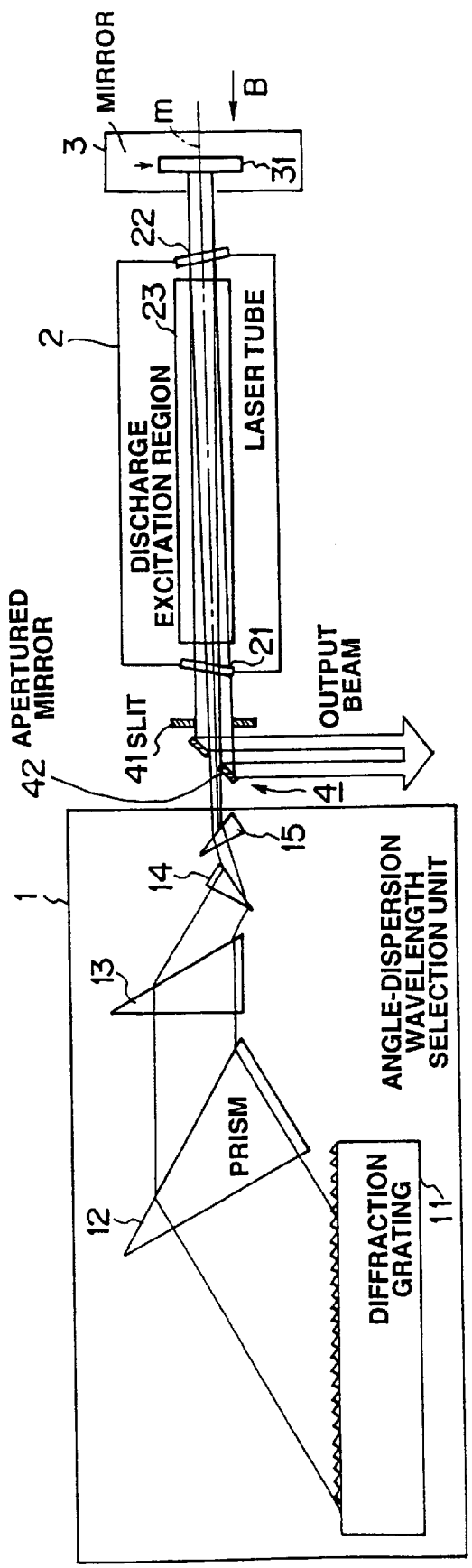
FIG. 5 is a layout diagram showing another embodiment of the present invention.

FIG. 5 is a view showing an embodiment of the present invention in more detail.

In this embodiment, a planar high-reflectivity mirror 31 is employed as beam folding unit 3 and, as shown by the chain-dotted line m, the optical axis of high-reflectivity mirror 31 is made to coincide with the optical axis of angle-dispersion wavelength selection element unit 1. On the other hand, an apertured mirror 42 formed with a slit-shaped aperture is employed as a construction whereby the functions of both beam branching unit 4 and beam restricting unit 5 of FIG. 1 can be achieved. In this case, apertured mirror 42 is arranged making an angle of about 45° with respect to the optical axis. As the apertured mirror 42, a mirror may be employed in which a slit-shaped anti-reflection film is provided in a central part, while parts other than this are coated with a highly reflection film. Slit 41 may be arranged as the construction to achieve the functions of beam restricting units 5 and 6 of FIG. 1.

In the apertured mirror 42, an optically transparent region and high-reflectivity region may be arranged such that the laser beam transparent region is provided in the interior of the cross-section of the laser beam that is emitted from discharge excitation region 23 and the high reflectivity region that reflects the laser beam is provided in the region outside the optically transparent region.

That is, in this embodiment, the beam that is input to angle-dispersion wavelength selection element unit 1 by the region outside the aperture (or anti-reflection film) of apertured mirror 42 is restricted in the direction of dispersion of angle-dispersion wavelength selection element unit 1. Also, in this embodiment too, as in the embodiment of FIG. 1 above, the light that passes straight through apertured mirror 42 is input to bandwidth narrowing means 1.

Furthermore, in this embodiment, in order to raise the beam restricting effect in direction of dispersion of angle-dispersion wavelength selection element unit 1, slit 41 may be arranged between apertured mirror 42 and laser tube 2. It should be noted that the slit 41 could also be provided on the beam output side of apertured mirror 41 (same as 6 of FIG. 1).

In this case, since angle-dispersion wavelength selection element unit 1 comprises a diffraction grating 11 of Littrow arrangement and four prism beam expanders 12–15, a spectral line width of less than 1 pm can be achieved by this construction in the case of an ArF narrow band laser apparatus. With the angle-dispersion wavelength selection element unit 1, high-speed wavelength control can be performed since wavelength can be controlled simply by rotating any one of the axes of diffraction grating 11 and prisms 12–15.

It should be noted that since, in the case of an excimer laser, the gain of the laser medium is high, efficient laser oscillation can be achieved by making the proportion of the amount of output light extracted 60–90% by adjusting the size of the slit-shaped aperture or anti-reflection film of apertured mirror 42 or the angle of arrangement of apertured mirror 42 etc. In Fig. reference numerals 5, 21 and 22 are windows and 23 is the discharge excitation region.

With this embodiment, since the output beam is output by an apertured mirror 42 formed with an aperture or anti-reflection film in its central part, the beam profile (cross-sectional shape of the beam) of the output beam has a shape, as shown in FIG. 6(a) in which the center part is absent. That is, as shown in FIG. 6(b), when apertured mirror 42 is seen from the direction B of FIG. 5, the discharge excitation region is present between discharge electrodes 24, 24' in laser tube 2, so the beam profile of the output beam is a "hollow" profile as shown in FIG. 6(a).

It should be noted that, although in the embodiment of FIG. 5 the beam profile of the output beam is a hollow profile as described above, the effect of this can be eliminated by increasing the distance travelled by the beam. Also, if ring illumination or off-axis illumination is performed in order to obtain high resolving power of the illumination optical system of the exposure tool, high-efficiency illumination may be achieved by using this beam without modification.

FIGS. 7(a)–7(e) show modified examples of the embodiment of FIG. 5; in these embodiments, instead of the apertured mirror 42 of FIG. 5, by employing a beam branching unit 4 as shown in FIG. 7(a)–7(e), a laser beam having a non-hollow beam profile can be output as the output beam.

In the beam branching unit 4 shown in FIG. 7(a), it is arranged to generate a non-hollow output beam by arranging the two totally reflecting mirrors 71 and 72 (whose surfaces are coated with reflection film 73) on different planes rather than on the same plane, and adjusting the positions in which these are arranged. It should be noted that the leading edge 74 of one of the totally reflecting mirrors 72 is made such that its angle falls off in tapered fashion such that the laser beam that is to be input to the wavelength selection element unit 1 is not reflected at this leading edge part.

In the case of the beam branching unit 4 of FIG. 7(b), generation of a hollow profile of the output beam is avoided by coating to provide a reflection film 73 and anti-reflection film 76 in the mode shown in FIG. 7(b) on optical member 75, one side of which (the side facing laser tube 2) is processed to form a surface shape of the same shape as that of FIG. 7(a).

In the beam branching unit 4 of FIG. 7(c), the production of a hollow profile of the output beam is avoided by coating optical member 75, whose surface on the reverse side to FIG. 7(b) (i.e. on the side nearest wavelength selection element unit 1) has been worked to a shape identical with that of FIG. 7(a) with reflection film 73 and anti-reflection film 76 in the mode shown in FIG. 7(c). In this case, the output beam is emitted through optical member 75.

In the beam branching unit 4 of FIG. 7(d), coating of the central portion region 77 with anti-reflection film 76 is rendered unnecessary by setting the angle of the central region 77 such that, of the surface of optical member 75 facing laser tube 2, the angle of incidence φ with respect to the central part region 77 which is not coated with reflection film 73 coincides with the Brewster's angle. In this case, a anti-reflection film 76 is arranged to be provided in the center part facing the back-face (i.e. the side facing wavelength selection element unit 1) of optical member 75.

In the beam branching unit 4 of FIG. 7(e), the angles of the central part regions 77, 78 are set such that the angle of incidence φ coincides with the Brewster's angle for both the central region 77 of the front face and central region 78 of the back face of optical member 75. Consequently, in this case, coating with a anti-reflection film is unnecessary both for the front face and the back face.

Figure 8:
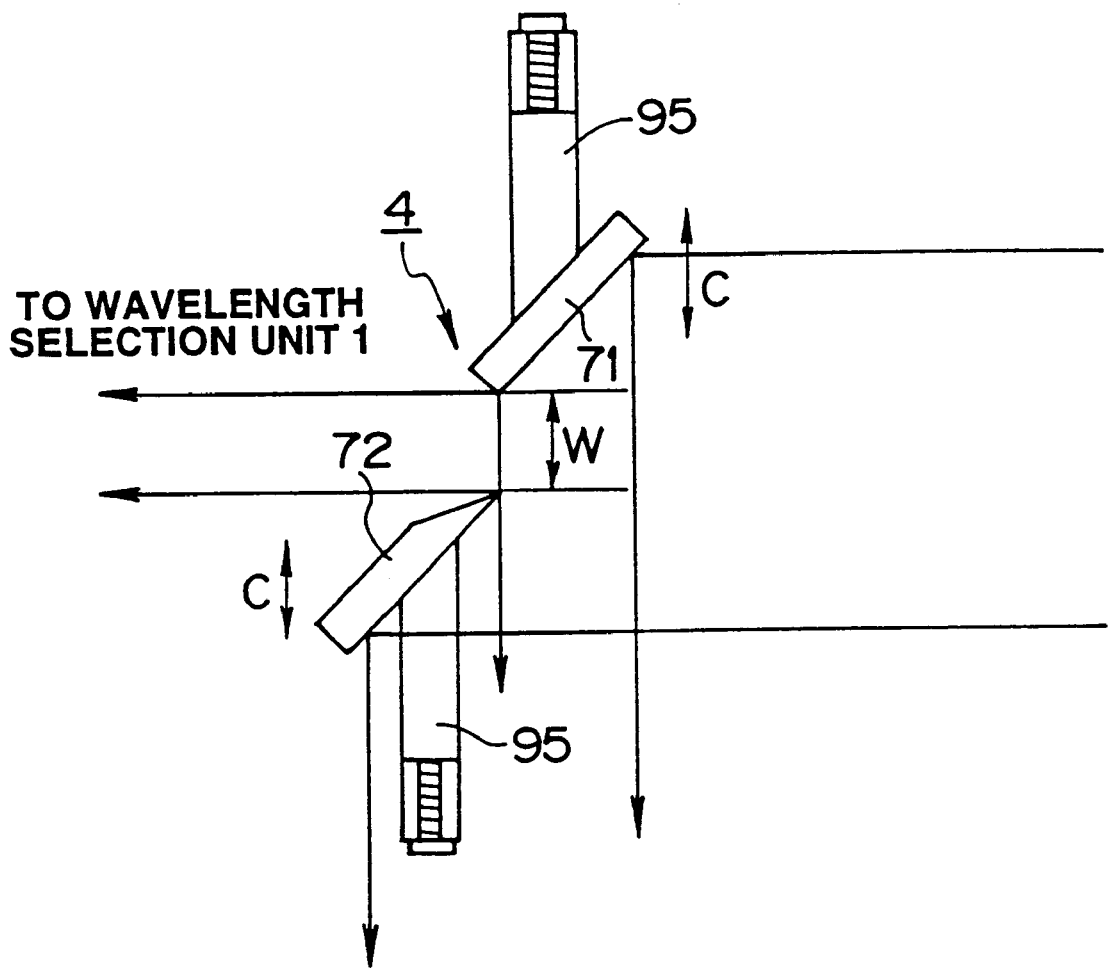
FIG. 8 is a view showing a constructional example of the case where the apertured mirror of FIG. 5 is movable.

Referring now to FIG. 8, the two totally reflecting mirrors 71 and 72 of beam output mirror 70 of FIG. 7(a) above are linked by linear movable mechanisms 95. B means of these linear movable mechanisms 95, totally reflecting mirrors 71, 72 are constituted to be movable in direction C, and the aperture width W of beam branching unit 4 can thereby be freely adjusted. With this construction, the spectral line width of the laser beam and the spectral distribution shape can easily be optimized. Linear movable mechanisms 95 can be arranged to move reflecting mirrors 71 and 72 respectively independently, or may be linked such as to be capable of moving them in integrated fashion in opposite directions.

FIGS. 9(a)–9(e) illustrate modified examples of the embodiment of FIG. 5. In this embodiment, in place of the highly reflecting mirror 31 of the beam folding unit 3 of FIG. 5, by employing another beam folding unit 3 shown in FIG. 9(a)–9(e), ASE light is reduced in amount and spectral purity of the output beam is improved.

In FIG. 9(a), beam folding unit 3 is constituted by means of a prism 80 and a mirror 81. That is, since the ASE light is propagated in various directions, the ASE light can be made to diverge outside the narrow-band laser beam by prism 80, so that it is reflected by the mirror 81 and so can be eliminated.

In FIG. 9(b), a mirror 82 formed with irregularities in its surface is employed to arrange that ASE light is made to fly off by the irregular reflecting mirror 82 in directions such that it does not return to laser tube 2.

In FIG. 9(c), beam folding unit 3 is constituted by a lens 83, spatial aperture 84, and concave-surface reflecting mirror 85, so that the ASE light is cut off at locations outside the hole of spatial aperture 84.

In FIG. 9(d), beam folding unit 3 is constituted by lens 86, spatial aperture 84, lens 87 and plane mirror 88, so that the ASE light at locations outside the hole of spatial aperture 84 is cut off. Lens 86, spatial aperture 84 and lens 87 may be arranged between laser tube 2 and apertured mirror 42.

In FIG. 9(e), beam folding unit 3 is constituted by a cylindrical lens 89, slit 90, cylindrical lens 91 and plane mirror 92, so that ASE light is cut off at locations outside the whole of slit 90. Cylindrical lens 89, slit 90 and cylindrical lens 91 may be arranged between laser tube 2 and apertured mirror 42.

In this case, in FIGS. 9(c)–9(e), spatial aperture 84 etc. are provided on the optical path in the laser resonator. Consequently, with such an arrangement, more ASE components can be effectively removed than if for example the spatial aperture etc. were to be provided on the optical path of the output beam after reflection by the apertured mirror 42.

Figure 9:
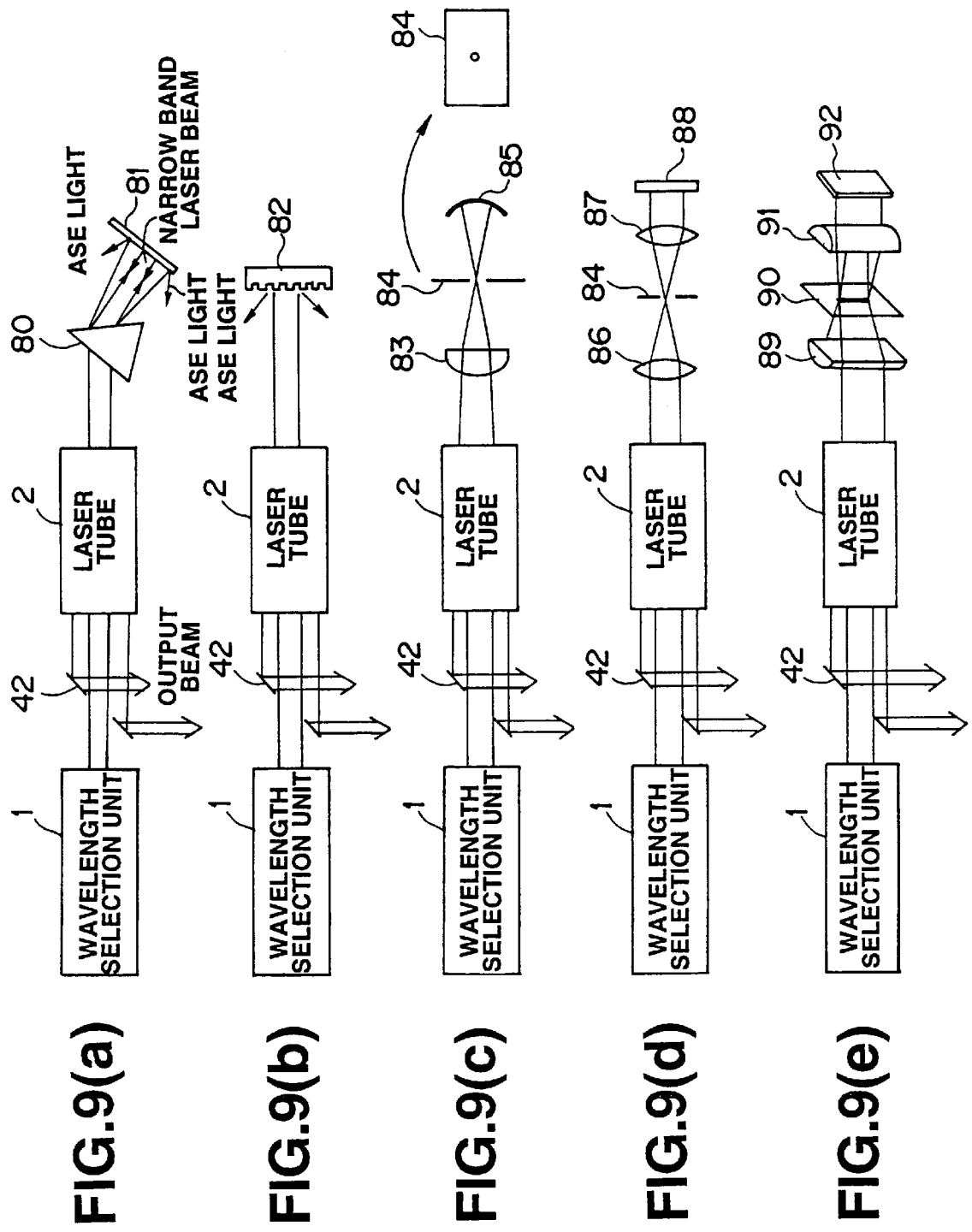
FIGS. 9(*a*) through 9(*e*) are views showing various modified examples of the beam folding unit of the embodiment of FIG. 5.

It should be noted that, in the construction of FIG. 9, by exchanging the apertured mirror 42 with beam branching unit 4 as shown in FIG. 7, a hollow profile of the output beam could be prevented from occurring.

Figure 10:
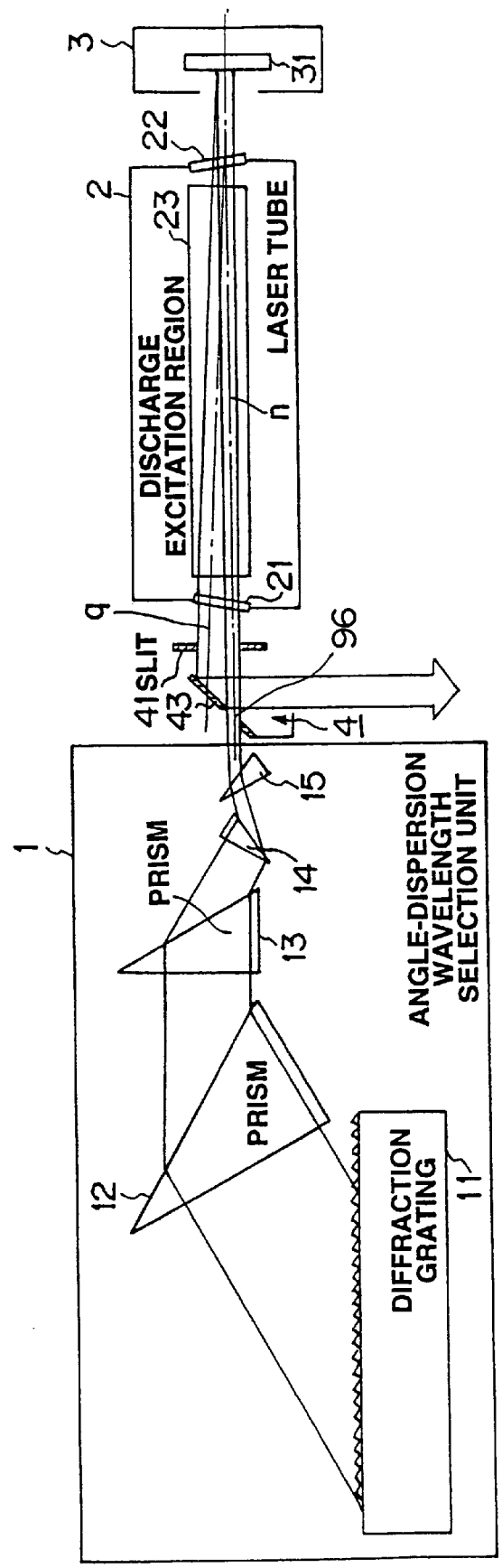
FIG. 10 is a view showing a further embodiment of the present invention.

A further embodiment of the present invention is illustrated in FIG. 10.

In the embodiment of FIG. 10, a hollow profile of the output beam is prevented by providing an apertured mirror 43 in place of the apertured mirror 42 of FIG. 5.

Specifically, whereas, in the case of apertured mirror 42 of FIG. 5, the slit-shaped aperture was provided in approximately the central portion of apertured mirror 42, in the case of the apertured mirror 43 of FIG. 10, the slit-shaped aperture 96 is formed in the lower portion in the drawing of apertured mirror 43 (FIG. 10 is a plan view, so, more precisely, aperture 96 is formed offset sideways from the center). As a result, in this embodiment, the light in the lower region of the laser beam in the drawing generated from discharge excitation region 23 is directed into angle-dispersion wavelength selection element unit 1.

Furthermore, in this case, the angle of the highly reflecting mirror 31 may be set such that the optical axis of highly reflecting mirror 31, which constitutes beam folding unit 3, is between the optical axis n of angle-dispersion wavelength selection element unit 1 and the line q joining the center of the upper highly reflective region of apertured mirror 43 and the center of the region where the laser beam of highly reflecting mirror 3 is essentially reflected, or coincides with either of these two axes n, q.

Also in the embodiment of FIG. 10, since the beam is restricted in the direction of angle-dispersion of means 1 for bandwidth narrowing by apertured mirror 43 and slit 41, parasitic oscillations are eliminated and the beam passing straight through apertured mirror 43 is directed on to means 1 for bandwidth narrowing, so bending of the optical path of the resonator is eliminated, making the resonance system more stable and so eliminating multi-wavelength oscillations produced by vibration. Furthermore, hollow-profile of the output laser beam can be eliminated.

Figure 11A:
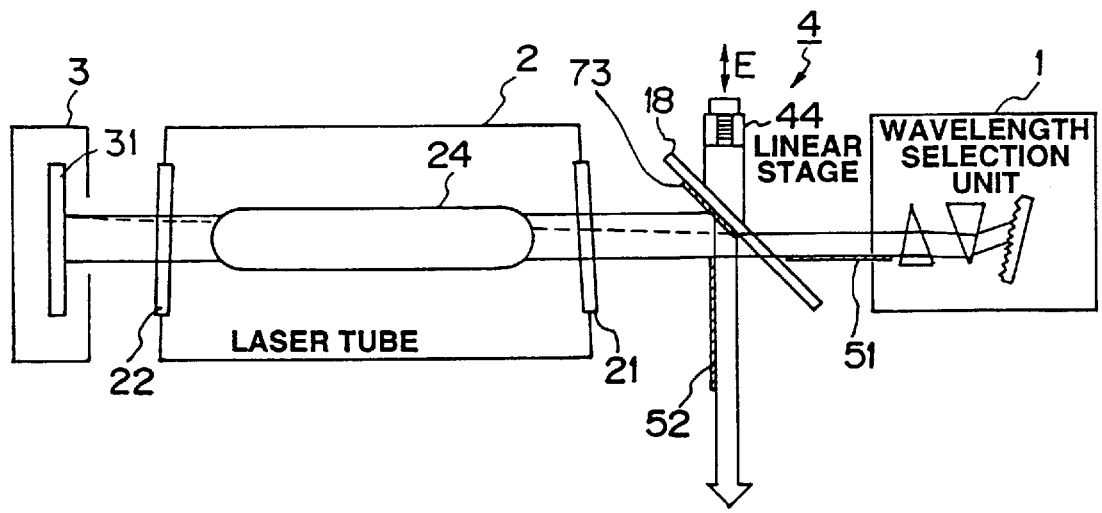
FIGS. 11(*a*) and 11(*b*) are views showing a further embodiment of the present invention.

FIG. 11(a) is a plan view showing an example of a construction wherein the embodiment shown in FIG. 10 is applied to an excimer laser of the discharge excitation type. In the beam branching unit 4 of this embodiment, one side of optically transparent substrate 18 (the top side in the drawing) is coated with reflection film 73, while the other side (bottom side in the drawing) is made an optically transparent region in order to achieve the same function as apertured mirror 43 of FIG. 10. Two optical screening plates 51, 52 are provided along the light beam in order to prevent parasitic oscillation by restraining divergence of the beam, moving conjointly with the beam branching unit 4.

Figure 11B:
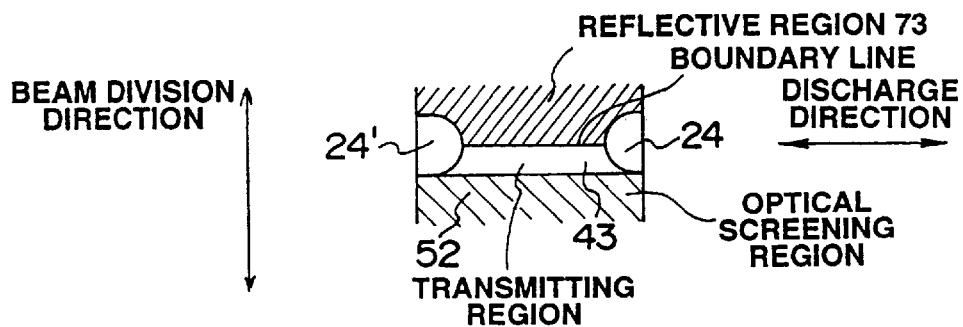

Consequently, in this embodiment, substrate 18 is divided into two, namely, a reflective region and an optically transparent region, bounded by a line parallel to the discharge direction (direction along the line joining discharge electrodes 24, 24'), as shown in FIG. 11(b).

In this embodiment also, just as in the case of the embodiment of FIG. 10, hollow profile of the output beam is prevented from occurring by providing an optically transparent region on one side of the center of substrate 18 and an optically reflecting region on the opposite side and by setting the angle of highly reflecting mirror 31 such that the optical axis of highly reflecting mirror 31 constituting the beam folding unit 3 is either between the optical axis of angle-dispersion wavelength selection element unit 1 and the line joining the center of the highly reflective region of apertured mirror 43 and the center of highly reflecting mirror 3, or coincides with either one of these axes.

Of course, in this embodiment of FIG. 11 also, parasitic oscillations are eliminated since the beam is restricted with respect to the angle-dispersion direction of means 1 for bandwidth narrowing by reflection film 73 of beam branching unit 4 and optical screening plates 51 and 52. Also, since the beam is directed into means 1 for bandwidth narrowing, after passing straight through beam branching unit 4, there is no bending of the optical path of the resonator, making the resonance system more stable and so eliminating multi-wavelength oscillation caused by vibration.

Also, in this case, substrate 18 is constituted so as to be movable in the direction (direction E in the Figure) perpendicular to the discharge direction, by means of a linear stage 44; the ratio of the output beam and the beam that is input to the angle-dispersion wavelength selection element unit 1 can thereby be adjusted.

Furthermore, in this embodiment, the angle-dispersion direction of the angle-dispersion wavelength selection element is practically the same as the direction in which the angle of divergence of the laser beam is smallest (the angle of divergence of the laser beam is smaller in the direction perpendicular to the direction of discharge than in the direction of discharge), and, furthermore, the direction of beam division and the direction of discharge are practically orthogonal, so a spectral distribution of extremely narrow spectral line width can be obtained.

It should be noted that, although, in this embodiment, a reflective portion and transparent portion were provided on the substrate by coating part of the substrate 18 with reflection film, this region could be replaced simply by empty space by removing the optically transparent region of substrate 18 of FIG. 11(a) in the lower part of the Figure.

Figure 12A:
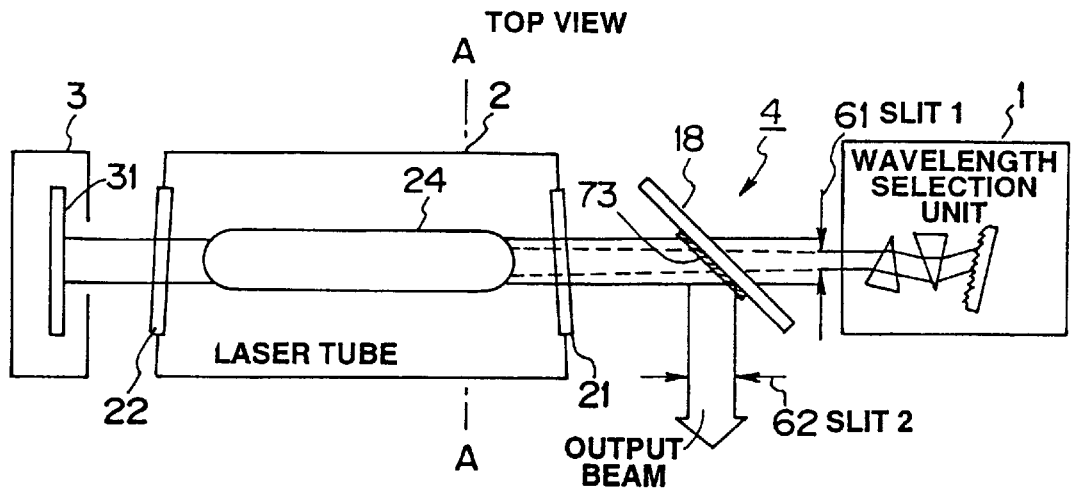
FIGS. 12(*a*) through 12(*c*) are views showing yet a further embodiment of the present invention.
Figure 12B:
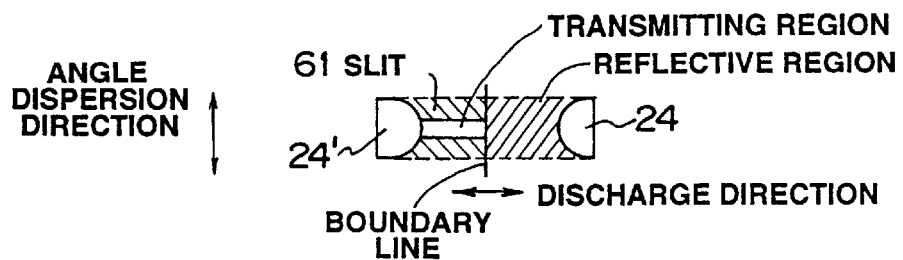
Figure 12C:
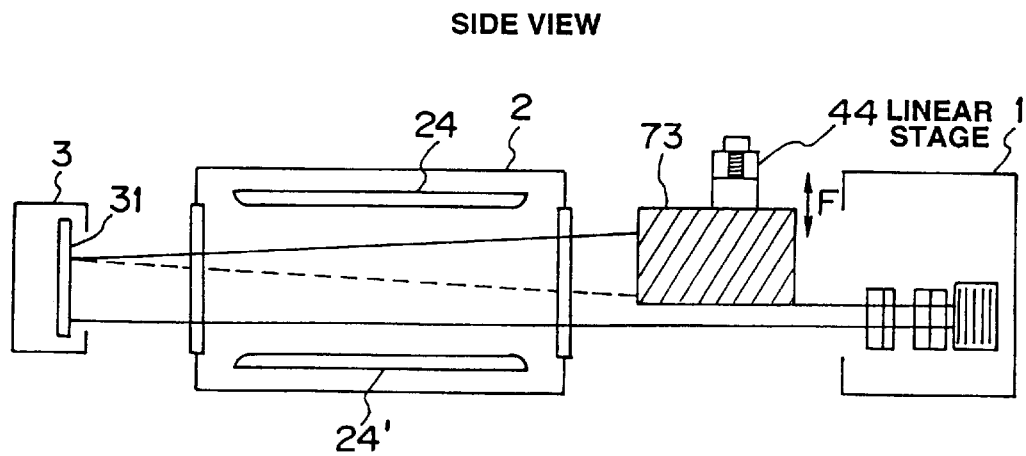

FIGS. 12(a)–12(c) illustrate yet a further embodiment of the present invention. In this embodiment, as shown in FIG. 12(b), substrate 18 constituting beam branching unit 4 is divided into two, namely, a reflective region and an optically transparent region, bounded by a line perpendicular to the direction of discharge (direction along the line joining discharge electrodes 24, 24'). Also, a slit 61 is provided between beam branching unit 4 and wavelength selection element unit 1, and a further slit 62 is also provided on the beam output side. Consequently, the optically transparent region that is divided into two as mentioned above is constituted as a region wherein the light is scattered and absorbed and an optically transparent region through which the light passes, by means of slit 61.

That is, parasitic oscillation is suppressed by restricting the beam with respect to the angle-dispersion direction of means 1 for bandwidth narrowing, by slits 61 and 62 and reflection film 73 of beam branching unit 4.

Also, in this embodiment too, substrate 18 is constructed so as to be movable in the direction parallel to the direction of discharge (direction F in FIG. 11(c)) by means of a linear stage 44, so the ratio of the output beam and the beam that is input to angle-dispersion wavelength selection element unit 1 can thereby be adjusted.

It should be noted that, in this embodiment also, the attitude angle of folding mirror 3 is set such that the optical axis of highly reflecting mirror 31 is either between the optical axis of angle-dispersion wavelength selection element unit 1 and the line joining the center of the reflective region of apertured mirror 43 and the center of highly reflecting mirror 3 or coincides with either one of these two axes.

Figure 13:
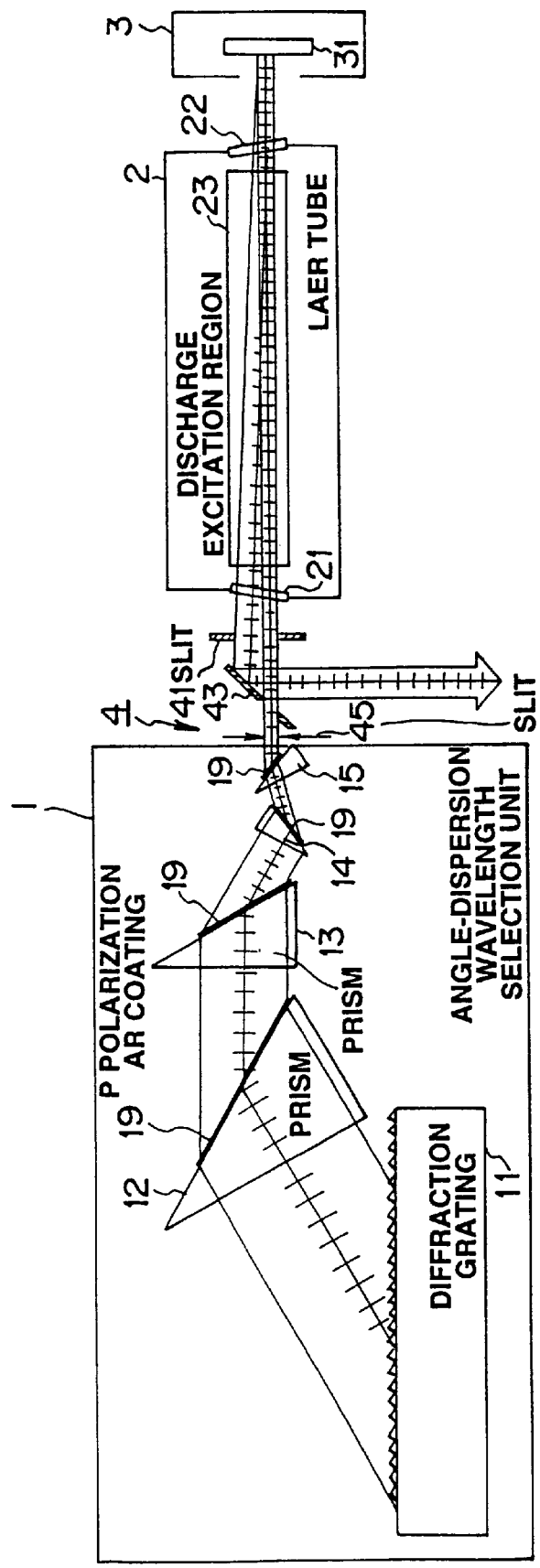
FIG. 13 is a view showing yet a further embodiment of the present invention.

FIG. 13 shows a further embodiment of the present invention.

In FIG. 13, the prisms 12–15 constituting the angle-dispersion wavelength selection element unit 1 are formed with an AR coating for P polarization (dielectric multi-layer film) 19. These P polarization AR coatings 19 permit only P-polarized light (light having a polarization plane in the same direction as the angle-dispersion direction of angle-dispersion wavelength selection element unit 1 i.e. light whose polarization plane is parallel to the plane of the Figure) to pass within angle-dispersion wavelength selection element unit 1. That is, the light that is subjected to bandwidth narrowing by angle-dispersion wavelength selection element unit 1 becomes P-polarized light.

The mirror surface of apertured mirror 43 is made such that it totally reflects only P-polarized light and either absorbs or transmits S-polarized light.

Consequently, the P-polarized light or S-polarized light generated in the discharge excitation region is input to the wavelength selection element 1 through the aperture slit of the apertured mirror 43 and only P-polarized light is subjected to bandwidth narrowing and folded back once more to the discharge excitation region and amplified. This amplified light is folded back by mirror 3 and is further amplified by passage through the discharge excitation region once more.

Thus, of the light issuing from laser tube 2 that has been subjected to bandwidth narrowing, only the P-polarized light that is input to the mirror face of apertured mirror 43 is reflected and output, while the light that is incident on to the slit of apertured mirror 43 is once more input to wavelength selection element 1. In contrast, the S-polarized wave is either absorbed or transmitted by the mirror face of apertured mirror 43 and is dispersed and reflected by the AR coating for P polarization of prisms 12–15 in wavelength selection element unit 1.

With this embodiment, of the P-polarized wave and S-polarized wave that are generated in the discharge excitation region, the S-polarized wave is not subjected to bandwidth narrowing, so all of the S-polarized wave constitutes ASE light. Also, this S-polarized wave is dispersed and reflected by the AR coating of prisms 12–15 and is absorbed or transmitted by the mirror face of apertured mirror 43, so, as a result, the ASE light can be greatly diminished.

Figure 14:
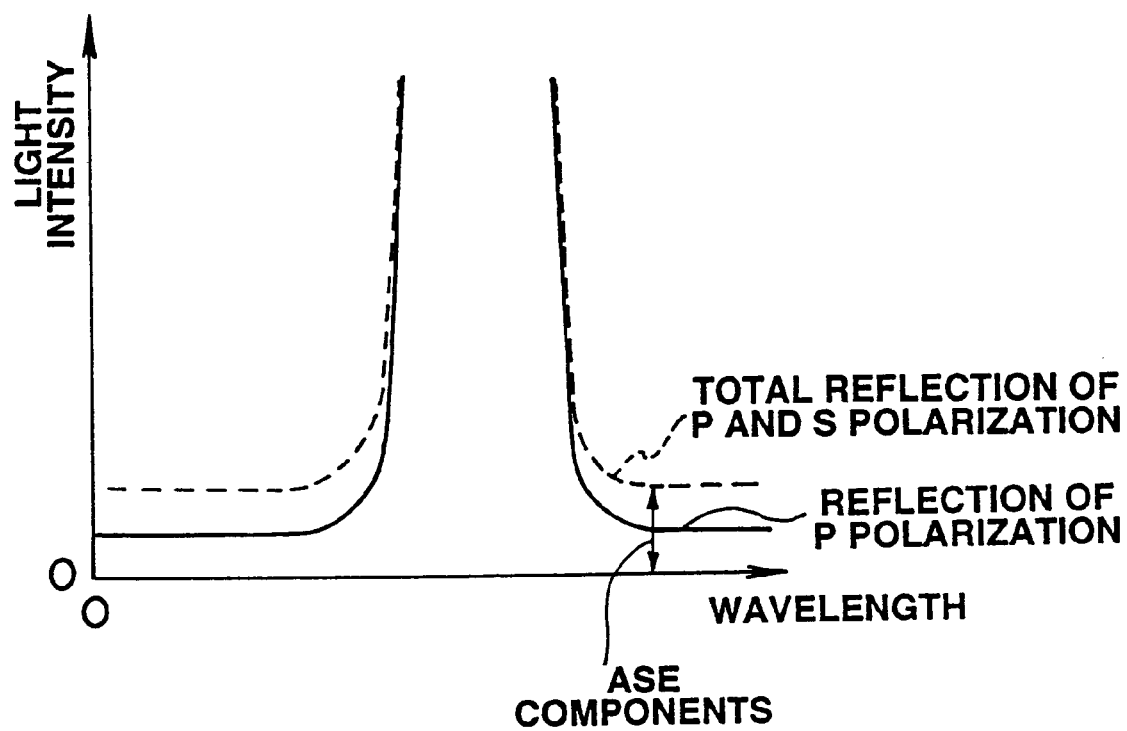
FIG. 14 is a view showing the spectral distribution of a laser beam that is output from the laser apparatus of the embodiment of FIG. 13.

FIG. 14 shows, for the construction of FIG. 13, the respective laser spectral waveforms for the case where an apertured mirror 43 is employed that totally reflects both the P and S polarized light and the case where an apertured mirror 43 is employed that totally reflects just the P polarized light.

As is clear from this Figure, in the case where an apertured mirror 43 is employed that reflects just the P polarized light, as in the case of the embodiment of FIG. 13, the ASE components can be practically halved in comparison with the case where an apertured mirror 43 is employed that totally reflects both the P and S polarized light.

It should be noted that if the mirror surface of apertured mirror 43 is made such that the S polarized wave is transmitted, the beam width of the S polarized wave passing through the mirror surface must be restricted by providing a slit 45 having practically the same slit width as the slit of apertured mirror 43.

Also, the narrow band beam can be made to be of P polarization by arranging a transparent type optical element having an angle of incidence other than perpendicular or having an angle of incidence of the Brewster's angle within the resonator using the fact that the surface reflectivity of a transparent type optical element having an angle of incidence other than perpendicular (0°) is less for P polarized light than it is for S polarized light. Consequently, a certain degree of P polarization can be achieved by using this method, even without AR coating of the prisms in the wavelength selection element unit.

Further techniques which are available for narrowing the bandwidth of the P polarized light only include arranging an optical element that transmits only P polarized light between window 21 on the laser output side and diffraction grating 11 (for example between window 21 on the output side and apertured mirror 43), or applying a coating that transmits only P polarized light.

Figure 15:
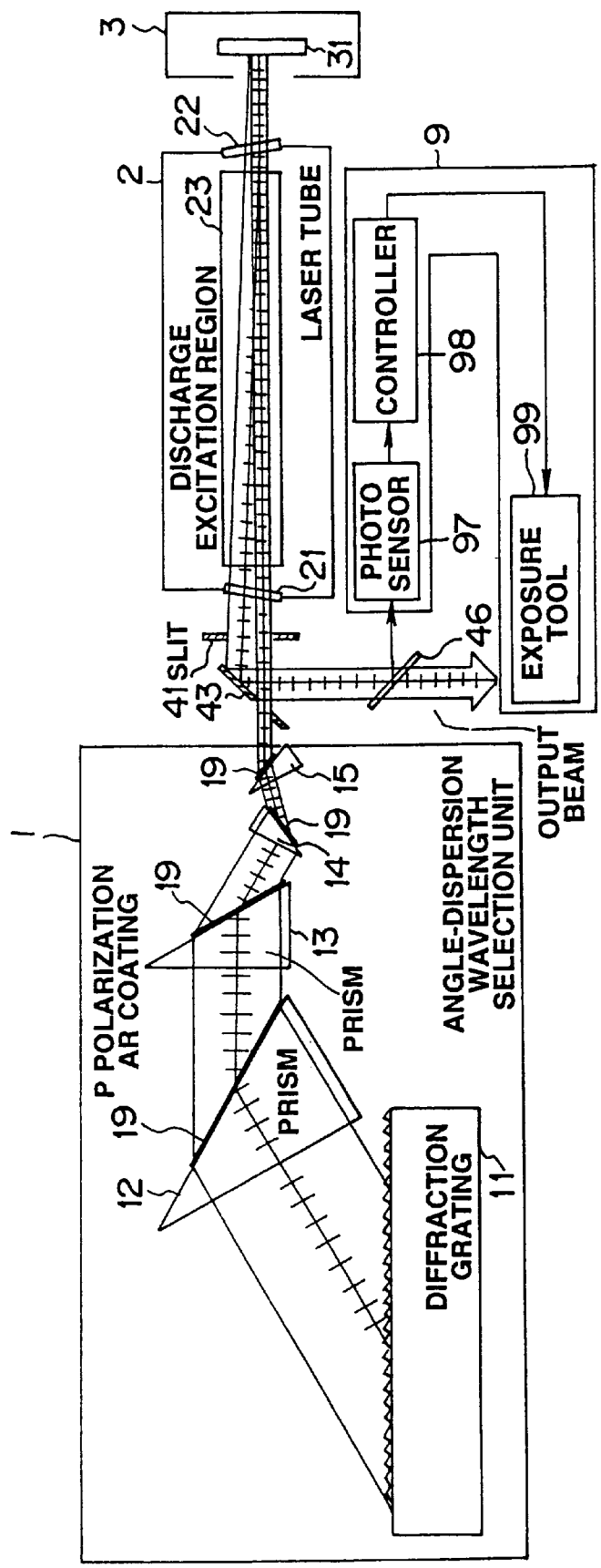
FIG. 15 is a view showing yet a further embodiment of the present invention.

FIG. 15 shows a modified example of the embodiment of FIG. 13. In this embodiment, it is arranged to detect the value of the ASE component and if the detected value exceeds a prescribed value this is identified as abnormal and is reported to semiconductor exposure tool 99.

Specifically, in this embodiment, an arrangement is used wherein a P-polarized light transmitting coating 19 is applied to prisms 12–15 such that all the light that is subjected to bandwidth narrowing becomes P polarized light and both P polarized light and S polarized light are reflected at apertured mirror 43. Furthermore, a polarizing mirror 46 that transmits P polarized light and reflects S polarized light is arranged on the optic path through which the output beam passes.

Consequently, in this case, the light that is finally output as the output beam is exclusively P polarized light and this is input to exposure tool 99.

In contrast, the S polarized wave that is reflected at polarizing mirror 46 is input to a photo-sensor 97. Controller 98 detects the light intensity and wavelength etc. of the output laser beam by means of the detection value of photo-sensor 97 and identifies abnormality of the output laser beam by means of these detection values and if it identifies abnormality reports this abnormality to exposure tool 99.

It should be noted that, in the embodiment of FIG. 13 or FIG. 15, it would be possible to perform bandwidth narrowing on the S polarization component and draw out the S polarization component as an output beam.

Figure 16:
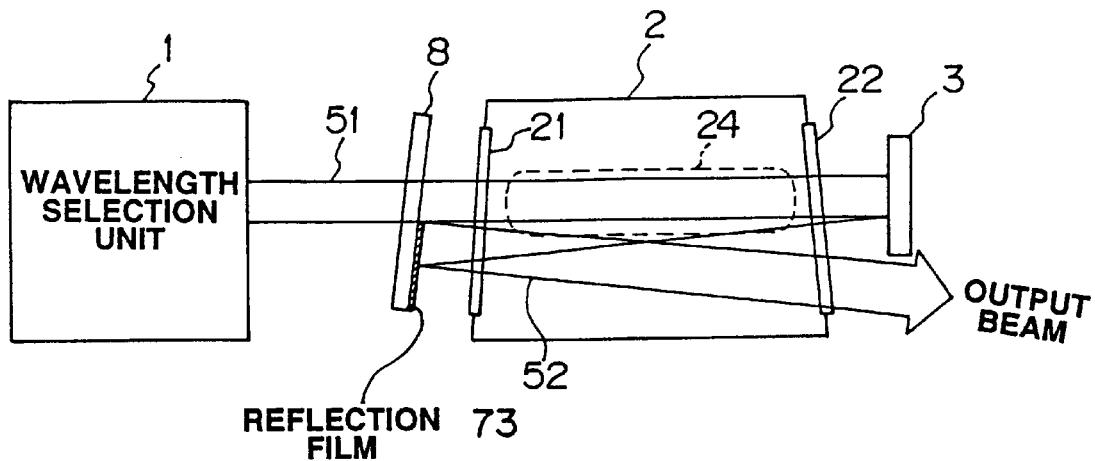
FIG. 16 is a view showing a further embodiment of the present invention.

Next, yet a further embodiment of this invention is illustrated in FIG. 16.

In this embodiment, the construction of the resonator and external optical system such as power monitor and wavelength monitor that are attached thereto is made more compact and simplified by drawing out the laser output beam in a direction practically along the direction of the optical axis of the resonator which is arranged in linear fashion.

In this embodiment, the output beam that is output by means of beam branching unit 8 is arranged to be output after passing through laser tube 2. Also, in this case, on passing through laser tube 2, the angles of arrangement of beam folding unit 3 and beam branching unit 3 are adjusted such as to graze slightly, or not to graze at all, discharge excitation region 24. It should be noted that, in this case, it is necessary to adjust the angles of arrangement of the beam folding unit 3 and beam branching unit 3 such that the plane containing the laser beam that is directed onto beam branching unit 3 from discharge excitation region 24 and the laser beam that is reflected by the beam branching unit 3 is parallel with the plane perpendicular to the direction of discharge (in this case, a surface parallel to the plane of the Figure).

Thus, in this embodiment also, since the light is input to means 1 for bandwidth narrowing after having passed straight through beam branching unit 8, there is no bending of the optical path of the resonator so the resonance system is stabilized and multi-wavelength oscillations caused by vibration are eliminated.

Figure 17:
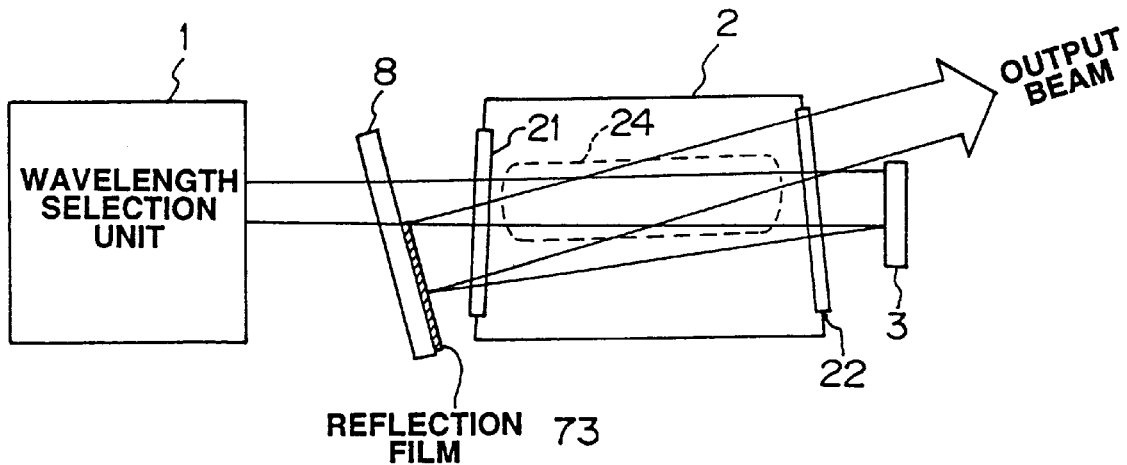
FIG. 17 is a view showing a further embodiment of the present invention.

FIG. 17 shows a modified example of the embodiment of FIG. 16. In this case, the output beam reflected by beam branching unit 8 is amplified by passing through discharge excitation region 24 before being output; the output of the laser is thereby further amplified and the narrow bandwidth output efficiency is raised. Furthermore, since the output beam is passed through inclined with respect to discharge excitation region 24, scarcely any ASE components are generated in the output beam, and lowering of beam mode cannot occur.

It should be noted that, in the embodiments of FIG. 16 and FIG. 17, when the output beam is output passing through the vicinity of folding mirror 3, it could be arranged for an optical member that is divided into two, namely a totally reflecting region and a transparent region, to be used in place of folding mirror 3, folding-back of the laser beam being effected by the totally reflecting region of the optical member and transmission of the output beam being effected in the transparent region.

Figure 18:
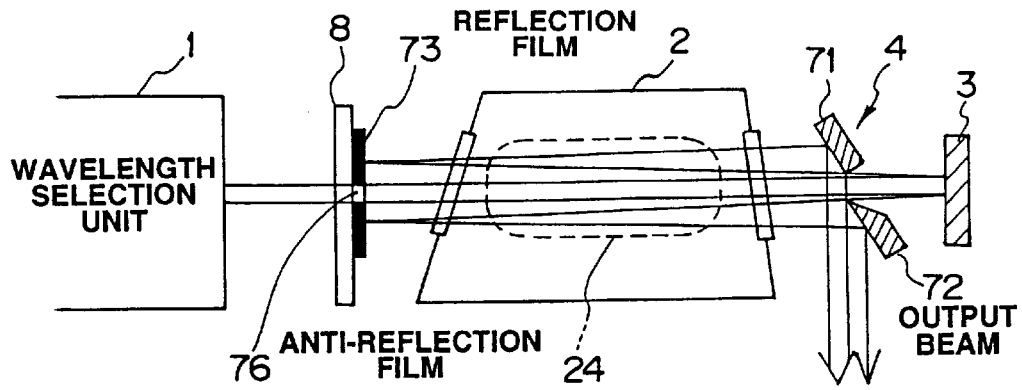
FIG. 18 is a view showing a further embodiment of the present invention.
Figure 19:
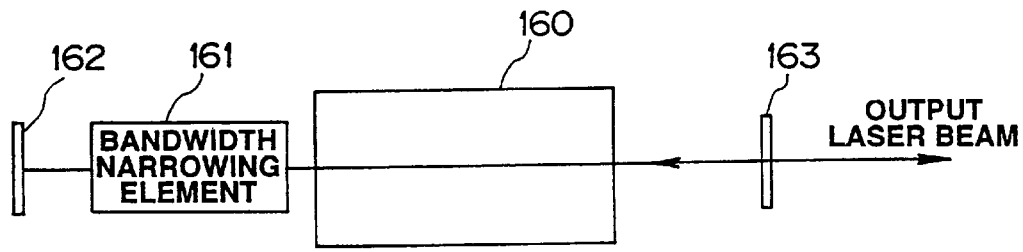
FIG. 19 is a view showing a conventional laser apparatus.

FIG. 18 shows a modified example of the embodiment of FIG. 17. In this embodiment also, it is arranged for the output beam that is reflected by beam branching unit 8 to be amplified by passing through discharge excitation region 24. However, in this embodiment, beam branching unit 8 is provided with a anti-reflection film in its central region and is provided with a reflection film 73 outside this, and beam branching unit 8 is arranged such as to be practically perpendicular with respect to the optical axis of the laser beam.

Between laser tube 2 and beam folding unit 3, there is arranged a beam branching unit 4 comprising two totally reflecting mirrors 71 and 72 shown in FIG. 7(*a*) above; the laser beam that is input from laser tube 2 is branched by the beam branching unit 4 into a laser beam destined for beam folding unit 3 and an output beam.

In this embodiment, since the beam is restricted by beam branching unit 8 in the angle-dispersion direction of means 1 for bandwidth narrowing, parasitic oscillations are eliminated and the beam is input to means 1 for bandwidth narrowing after passing straight through beam branching unit 8, so bending of the optical path of the resonator is eliminated, making the resonance system more stable and eliminating multi-wavelength oscillations produced by vibration. Moreover in addition to this, in this embodiment, the laser beam is amplified once more by passage through discharge excitation region 24, thus further amplifying the laser output and raising the efficiency of narrow bandwidth output.

It should be noted that beam branching unit 8 of FIG. 18 could be constituted by a mirror with an aperture or could be constituted by two mirrors.

Although in the above embodiment angle-dispersion optical elements such as prisms and diffraction grating etc. were employed as the bandwidth narrowing element, a wavelength selection element making use of repeated reflection, such as an etalon, could be employed.

INDUSTRIAL APPLICABILITY

The present invention is useful in application to narrow band laser apparatus such as excimer lasers employed as light sources for semiconductor exposure tools or for optical microlithography process.

We claim:

1. A narrow band laser apparatus comprising:

a laser generating section having laser activity for generating a laser beam;

bandwidth narrowing means arranged at one end of the laser generating section on an optical axis of the laser beam generated by the laser generating section, for narrowing bandwidth of the laser beam by means of at least one angle-dispersion wavelength selection element, and folding back the laser beam that has been narrowed in bandwidth to emit the laser beam to the laser generating section;

beam folding-back means arranged at another end of the laser generating section on the optical axis of the laser beam generated by the laser generating section, for folding-back the laser beam that is input, and reflecting it to the laser generating section; and a laser beam branching unit arranged between the laser generating section and the bandwidth narrowing means, having a reflective region and an optically transparent region that spatially separate the laser beam that is input from the laser generating section with respect to a sectional region of the laser beam for transmitting part of the laser beam that is input from the laser generating section through the optically transparent region to input it to the bandwidth narrowing means and deflecting a remaining part of the laser beam through the reflective region in a direction to avoid inputting the remaining part again to the laser generating section to output it as an output beam.

2. The narrow band laser apparatus according to claim 1 wherein the optical axis of the bandwidth narrowing means and the optical axis of the laser beam that is folded back by the beam folding-back means are practically coincide with each other, and the laser beam branching unit includes an optically transmitting region and a deflecting region arranged such that the optically transmitting region is present within the cross-section of the laser beam that is emitted from the laser generating section and the deflecting region that deflects the laser beam is present in the region outside the optically transmitting region.

3. The narrow band laser apparatus according to claim 1 wherein the laser beam branching unit is formed on one side with an optically transmitting region and on another side is formed with a deflecting region that deflects the laser beam; and the optical axis of the laser beam that is folded back by the beam folding-back means lies between the optical axis of the bandwidth narrowing means and the line joining the center of the deflection region of the laser beam branching unit and the center of the beam folding-back region of the beam folding-back means.

4. The narrow band laser apparatus according to claim 3 further comprising means for varying the width of the optically transmitting region in the direction of angle-dispersion of the angle-dispersion wavelength selection element.

5. The narrow band laser apparatus according to claim 3 wherein the laser generating section generates a laser beam by electric discharge produced by discharge electrodes; and the optically transmitting region and deflecting region of the laser beam branching unit are divided such that the boundary line that divides the optically transmitting region and deflecting region of the laser beam branching unit is parallel to the direction of the electric discharge by the discharge electrodes.

6. The narrow band laser apparatus according to claim 3 wherein the laser generating section generates a laser beam by electric discharge produced by discharge electrodes; and the optically transmitting region and deflecting region of the laser beam branching unit are divided such that the boundary line that divides the optically transmitting region and deflecting region of the laser beam branching unit is orthogonal to the direction of the electric discharge by the discharge electrodes.

7. The narrow band laser apparatus according to claim 1 wherein the bandwidth narrowing means comprises polarized light transmitting means for transmitting only a polarized light component having a polarization plane parallel to a plane containing the angle-dispersion direction of the angle-dispersion wavelength selection element; and the laser beam branching unit deflects only the polarization component that has been transmitted by the polarized light transmitting means and outputs it as an output beam.

8. The narrow band laser apparatus according to claim 1 wherein the bandwidth narrowing means comprises polarized light transmitting means for transmitting only a polarized light component having a polarization plane parallel to a plane containing the angle-dispersion direction of the angle-dispersion wavelength selection element; and the narrow band laser apparatus further comprises:

a polarized laser beam branching unit arranged on an optical path on output side of the laser beam branching unit, for branching a first polarized light component that is capable of passing through the polarized light transmitting means and a second polarized light component having a polarization plane orthogonal to the polarization plane of the first polarized light component;

photodetection means for detecting the second polarized light component branched by the polarized laser beam branching unit; and abnormality detecting means for detecting abnormality of the output beam based on the output of the photodetection means.

9. A narrow band laser apparatus comprising:

a laser generating section having laser activity for generating a laser beam;

bandwidth narrowing means arranged at one end of the laser generating section on an optical axis of the laser beam generated by the laser generating section, for narrowing bandwidth of the laser beam by means of at least one angle-dispersion wavelength selection element, and folding back the laser beam that has been narrowed in bandwidth to emit the laser beam to the laser generating section;

beam folding-back means arranged at another end of the laser generating section on the optical axis of the laser beam generated by the laser generating section, for folding-back the laser beam that is input, and reflecting it to the laser generating section;

a laser beam branching unit arranged between the laser generating section and the bandwidth narrowing means, for transmitting part of the laster beam that is input from the laser generating section to input it to the bandwidth narrowing means and deflecting the remaining part of the laser beam to output it as an output beam; and beam width restricting means width arranged between the laser beam branching unit and the bandwidth narrowing means or between the laser beam branching unit and the laser generating section, for restricting the width of the laser beam in the angle-dispersion direction of the angle-dispersion wavelength selection element.

10. The narrow band laser apparatus according to claim 9 further comprising second beam width restricting means width arranged in the optical path on the output side of the laser beam branching unit, for restricting width of the output beam in the angle-dispersion direction of the angle-dispersion wavelength selection element.

11. The narrow band laser apparatus according to claim 1 wherein one face on one side of the laser beam and another face on another side of the laser beam snadwich the optically transmitting region of the deflecting region of the laser beam branching unit and comprises two different parallel faces;

wherein a position of the end part of the optically transmitting region of the one face relative to a direction perpendicular to the direction of deflection of the laser beam and a position of the end part of the optically transmitting region of the other face relative to a directiion perpendicular to the direction of deflection of the laser beam coincide with each other.

12. The narrow band laser apparatus according to claim 1 further comprising means for varying the width of the optically transmitting region in the direction of angle-dispersion of the angle-dispersion wavelength selection element.

13. A narrow band laser apparatus comprising:

a laser generating section having laser activity, for generating a laser beam;

bandwidth narrowing means arranged at one end of the laser generating section on an optical axis of the laser beam generated by the laser generating section, for narrowing bandwidth of the laser beam by means of at least one angle-dispersion wavelength selection element, and folding back the laser beam that has been narrowed in bandwidth to emit the laser beam to the laser generating section;

beam folding-back means arranged at another end of the laser generating section on the optical axis of the laser beam generated by the laser generating section, for folding-back the laser beam that is input and reflecting it to the laser generating section;

a laser beam branching unit arranged between the laser generating section and the bandwidth narrowing means, for inputting part of the laser beam that is input from the laser generating section to the bandwidth narrowing means and deflecting a remaining part of the laser beam in a direction to avoid inputting the remaining part again to the laser generating section and outputting it as an output beam; and beam width restricting means width for restricting the width of the laser beam that is input to the bandwidth narrowing means in the direction of angle-dispersion of the angle-dispersion wavelength selection element.

14. A narrow band laser apparatus comprising:

a laser generating section having laser activity for generating a laser beam by electric discharge produced by discharge electrodes;

the laser beam branching unit outputting a reflected laser beam through a discharge excitation region between the discharge electrodes;

bandwidth narrowing means arranged at one end of the laser generating section on an optical axis of the laser beam generated by the laser generating section, for narrowing bandwidth of the laser beam by means of at least one angle-dispersion wavelength selection element, and folding back the laser beam that has been narrowed in bandwidth to emit the laser beam to the laser generating section;

beam folding-back means arranged at another end of the laser generating section on the optical axis of the laser beam generated by the laser generating section, for folding-back the laser beam that is input, and reflecting it to the laser generating section;

a laser beam branching unit arranged between the laser generating section and the bandwidth narrowing means, for transmitting part of the laster beam that is input from the laser generating section to input it to the bandwidth narrowing means and deflecting the remaining part of the laser beam to output it as an output beam.

15. The narrow band laser apparatus according to claim 14 wherein the laser generating section generates a laser beam by electric discharge produced by discharge electrodes; and the laser beam branching unit outputs a reflected laser beam through a discharge excitation region between the discharge electrodes.

16. A narrow band laser apparatus comprising:

a laser generating section for generating a laser beam by electric discharge produced by discharge electrodes;

bandwidth narrowing means arranged at one end of the laser generating section on an optical axis of the laser beam generated by the laser generating section, for narrowing the bandwidth of the laser beam by means of at least one angle-dispersion wavelength selection element and for folding back the laser beam of narrowed bandwidth and outputting it to the laser generating section;

beam folding-back means arranged at another end of the laser generating section on the optical axis of the laser beam generated by the laser generating section, for folding back the input laser beam and reflecting it to the laser generating section;

a first beam branching unit arranged between the laser generating section and the bandwidth narrowing means that transmits part of the laser beam that was input from the laser generating section and inputs it into the bandwidth narrowing means and reflects remaining part and inputs it to the discharge excitation region between the discharge electrodes of the laser generating section; and a second beam branching unit arranged between the laser generating section and the beam folding-back means, for transmitting part of the laser beam that is input from the laser generating section and inputting it to the beam folding-back means and for deflecting remaining part to output it as an output beam.

* * * * *